United States Patent
Kurosawa et al.

(10) Patent No.: US 12,012,491 B2
(45) Date of Patent: Jun. 18, 2024

(54) METHOD FOR PRODUCING POLYAMIDE RESIN FILM

(71) Applicant: UNITIKA LTD., Osaka (JP)

(72) Inventors: Akiko Kurosawa, Uji (JP); Atsuko Noda, Uji (JP)

(73) Assignee: UNITIKA LTD., Osaka (JP)

( * ) Notice: Subject to any disclaimer, the term of this patent is extended or adjusted under 35 U.S.C. 154(b) by 0 days.

(21) Appl. No.: 17/794,030

(22) PCT Filed: Jan. 22, 2021

(86) PCT No.: PCT/JP2021/002310
§ 371 (c)(1),
(2) Date: Jul. 20, 2022

(87) PCT Pub. No.: WO2021/149815
PCT Pub. Date: Jul. 29, 2021

(65) Prior Publication Data
US 2023/0054022 A1    Feb. 23, 2023

(30) Foreign Application Priority Data

Jan. 24, 2020 (JP) .................................. 2020-010068

(51) Int. Cl.
*C08J 5/18* (2006.01)
*B32B 27/34* (2006.01)
(Continued)

(52) U.S. Cl.
CPC .............. *C08J 5/18* (2013.01); *B32B 27/34* (2013.01); *C08J 11/10* (2013.01); *C08L 77/02* (2013.01);
(Continued)

(58) Field of Classification Search
CPC . C08J 5/18; C08J 11/10; C08J 2377/02; C08J 2477/02; B32B 27/34;
(Continued)

(56) References Cited

U.S. PATENT DOCUMENTS

| 5,233,037 A | 8/1993 | Nielinger et al. |
| 10,396,316 B2 | 8/2019 | Amano et al. |
| (Continued) | | |

FOREIGN PATENT DOCUMENTS

| CN | 1058026 A | 1/1992 |
| CN | 107163572 A | 9/2017 |
| (Continued) | | |

*Primary Examiner* — John D Freeman
(74) *Attorney, Agent, or Firm* — Locke Lord LLP; James E. Armstrong, IV; Nicholas J. DiCeglie, Jr.

(57) ABSTRACT

To provide a method for producing a polyamide resin film by using a polyamide resin obtained through polymerization of a regenerated monomer used as a recycled material. Provided is a method for producing a polyamide resin film, including: (1) a step of producing a monomer from a raw material (A) for depolymerization, (2) a step of producing a polyamide resin (B) through polymerization using a raw material containing the monomer. (3) a step of refining the polyamide resin (B), and (4) a step of producing an unstretched film using a starting material containing the refined polyamide resin (B), and stretching the unstretched film.

8 Claims, 1 Drawing Sheet

(51) Int. Cl.
*C08J 11/10* (2006.01)
*C08L 77/02* (2006.01)

(52) U.S. Cl.
CPC ....... *B32B 2272/00* (2013.01); *B32B 2305/70* (2013.01); *B32B 2307/518* (2013.01); *B32B 2307/704* (2013.01); *B32B 2307/75* (2013.01); *B32B 2439/00* (2013.01); *C08L 2207/20* (2013.01)

(58) Field of Classification Search
CPC ........... B32B 2307/518; B32B 2439/00; C08L 77/02; C08L 2207/20; B29C 55/005; B29C 55/12; C08G 69/14; C08G 69/04; Y02P 20/143; Y02W 30/62; B29D 7/01; B29K 2077/00; C08K 3/36
See application file for complete search history.

(56) References Cited

U.S. PATENT DOCUMENTS

| | | | | |
|---|---|---|---|---|
| 2010/0080985 A1 | * | 4/2010 | Noda | B32B 27/34 |
| | | | | 528/323 |
| 2023/0250252 A1 | * | 8/2023 | Chang | C08J 11/08 |
| | | | | 521/40 |

FOREIGN PATENT DOCUMENTS

| | | | | |
|---|---|---|---|---|
| CN | 111518269 A | * | 8/2020 | ............ C08G 69/26 |
| EP | 2098560 A1 | | 9/2009 | |
| JP | H05-194377 A | | 8/1993 | |
| JP | H06-328641 A | | 11/1994 | |
| JP | H07-330718 A | | 12/1995 | |
| JP | H10-287645 A | | 10/1998 | |
| JP | H10-298162 A | | 11/1998 | |
| JP | 2001-58366 A | | 3/2001 | |
| JP | 2002-173598 A | | 6/2002 | |
| JP | 2008-297416 A | | 12/2008 | |
| JP | 2016-184477 A | | 10/2016 | |
| JP | 2018-70786 A | | 5/2018 | |
| JP | 2018-95863 A | | 6/2018 | |
| WO | 2008/75461 A1 | | 6/2008 | |
| WO | WO-2019137303 A1 | * | 7/2019 | ........... C08G 69/265 |

\* cited by examiner

METHOD FOR PRODUCING POLYAMIDE RESIN FILM

TECHNICAL FIELD

This invention relates to a method for producing a polyamide resin film containing a polyamide resin made from a large amount of recycled raw materials.

BACKGROUND ART

It has been a long time since environmental issues began to attract attention. The awareness of the need to ensure environmental sustainability has heightened in recent years once again. There has been a high demand for recycling resin waste materials from before, and recycled resins from resin waste materials have been used as raw material resins. Examples of waste materials produced during the production of a thermoplastic resin stretched film include waste scraps such as edge trimming scraps and slit scraps, as well as films that were not commercialized as defective products and the like. Material recycling has been commonly conducted using pellets made by melting these waste materials again as remelted resins (raw materials).

However, material recycling reduces productivity, especially for polyamide resin films with high stretching stress, because the content of foreign matters, thermal degradation products, and the like increases with the increase in the content of remelted resin, which makes the film more prone to be cut during stretching. Furthermore, it is difficult to control the amount of additives contained in the remelted resin, and therefore, local characteristic changes may occur on the film surface, which may result in printing defects, adhesion failures, and other problems. Therefore, the amount of remelted resins that can be contained in a polyamide resin film is limited, and it is considered that there are also limits to increasing recycling rates.

Meanwhile, laminated films, such as packaging films, in which multiple types of resin materials, including a printing layer, a barrier layer, an adhesive layer, and a sealant layer, are laminated, are difficult to separate into each raw material, and sometimes difficult to recycle.

In such a case, a technique of depolymerizing resin waste materials and using the depolymerized product as monomers (regenerated monomers) has been known, and such a technique is also called chemical recycling. In particular, various chemical recycling methods have also been proposed for polyamide resins. For example, a method has been known, including melting nylon 6, removing metals, recovering ε-caprolactam obtained by depolymerization reaction to recycle the recovered ε-caprolactam as a fiber raw material, resin raw material, and the like (see PTL 1 and PTL 2).

CITATION LIST

Patent Literature

[PTL 1] Japanese Patent Application Publication No. H07-330718
[PTL 2] Chinese Patent Application Publication No. 91106147.9

SUMMARY OF INVENTION

Technical Problem

However, even if the monomers obtained by depolymerization of a resin waste material of a polyamide resin are polymerized, polyamide resins suitable for films cannot be obtained. That is, a film having excellent strength, elasticity, and the like cannot be obtained.

In addition, in recent years various printings are made on product packages, such as packaging containers, and demands for an appearance after printing tend to be increasingly higher. Meanwhile, there is room for improving the suitability for printing on films (in particular, reproducibility of light color portions (low-gradation portions) in a deep and light color expression).

Accordingly, the main object of the present invention is to provide a method for producing a polyamide resin film by using a polyamide resin obtained through polymerization of a regenerated monomer used as a recycled material. Furthermore, the present invention has an object to provide a polyamide resin film that can exhibit printability equivalent to or better than conventional products.

Solution to Problem

The present inventor has made intensive studies in view of the problem of the conventional art, and as a result, has found that the objects mentioned above can be achieved by using a specific raw material containing a regenerated monomer in the production of films, and completed the present invention.

That is, the present invention relates to the following polyamide resin and production method thereof.

1. A method for producing a polyamide resin film, the method including:
   (1) a step of producing a monomer from a raw material (A) for depolymerization;
   (2) a step of producing a polyamide resin (B) through polymerization using a raw material containing the monomer;
   (3) a step of refining the polyamide resin (B); and
   (4) a step of producing an unstretched film using a starting material containing the refined polyamide resin (B), and stretching the unstretched film.

2. The production method according to 1 above, wherein the monomer contains ε-caprolactam.

3. The production method according to 1 above, further including a step of adjusting moisture content in an unstretched film to 2 to 10 mass % in advance, prior to stretching.

4. The production method according to 1 above, wherein starting materials partly contain a remelted resin obtained by melting a polyamide resin (provided that the polyamide resin (B) is excluded) and a content of the remelted resin is 1 mass % or more.

5. The production method according to 1 above, wherein the refined polyamide resin (B) has a relative viscosity ηR of 2.5 to 4.5.

6. The production method according to 1 above, wherein the raw material (A) for depolymerization is at least one of a polyamide 6 resin and an oligomer thereof.

7. A polyamide resin film, wherein, when the film is halftone-printed, the polyamide resin film includes 100 or less missing dots in 1000 mm$^2$ of a 10% gradation part in a halftone-printed film.

8. The polyamide resin film according to 7 above, which has a caprolactam monomer concentration of 1.6 mass % or less in the polyamide resin film.

9. The polyamide resin film according to 7 above, wherein an amino terminal group content and a carboxyl terminal group content in the polyamide resin film are each 80 mmol/kg or less.

10. The polyamide resin film according to 7 above, which has a ratio (minimum/maximum) of 0.5 to 1.0 between a maximum and a minimum of film impact strengths under an atmosphere at a temperature of 23° C. and a humidity of 50% RH.

11. The polyamide resin film according to 7 above, which includes a polyamide resin that shows a half width of 10° C. or more of a crystallization peak during cooling.

12. The polyamide resin film according to claim 7, is biaxially oriented.

13. A laminated film including the polyamide resin film according to any one of 7 to 12 above, and a sealant resin layer laminated on the polyamide resin film.

14. A packaging material including the polyamide resin film according to any one of 7 to 12 above.

15. A polyamide resin film obtained by the method according to any one of 1 to 6 above.

Advantageous Effects of Invention

The present invention can provide a polyamide resin film that can exhibit a printability equivalent to or better than conventional products (brand-new products) even when a polyamide resin obtained through polymerization of a regenerated monomer used as a recycled material. More specifically, the present invention can provide a polyamide resin film (particularly, a biaxial-stretched polyamide resin film) that efficiently inhibits deterioration of local printing appearance, deterioration of adhesion properties, and the like by using a polyamide resin made from a regenerated monomer.

Moreover, the polyamide resin film of the present invention can be suitably used, especially as a packing material, because of its reduced impact strength unevenness and excellent general properties such as film elasticity, wettability, and haze.

Since the production method of the present invention allows the use of a resin waste material as a raw material, the production method can provide a recycled polyamide resin film with a high recycle ratio of, for example, 50% or more. This promotes the reuse of resources, which makes it possible to contribute to environmental preservation as a sustainable technique.

DESCRIPTION OF EMBODIMENTS

1. Production Method of Polyamide Resin Film

The production method of the present invention is a method for producing a polyamide resin film, the method including:

(1) a step of producing a monomer from a raw material (A) for depolymerization (depolymerization step);

(2) a step of producing a polyamide resin (B) through polymerization using a raw material containing the monomer (polymerization step);

(3) a step of refining the polyamide resin (B) (refining step); and (4) a step of producing an unstretched film using a starting material containing the refined polyamide resin (B) and stretching the unstretched film (filming step).

Depolymerization Step

In the depolymerization step, a monomer is regenerated from a raw material (A) for depolymerization (hereinafter, such a monomer is referred to as a "regenerated monomer").

The regenerated monomer is particularly preferably a lactam, and for example, ε-caprolactam, enantolactam, capryllactam, lauryl lactam, and the like can be used. Among them, ε-caprolactam is particularly preferred.

The type of the raw material (A) for depolymerization is not particularly limited, and various polyamide resins, as well as oligomers of various polyamide resins can be used. More specifically, various resins listed as the polyamide resin (B), which will be mentioned later, can be mentioned as examples thereof. Examples of the oligomer may include chain substances from dimers up to about heptamers and circular substances from dimers up to about nonamers, and the like.

In particular, at least one of polyamide 6 resins and oligomers thereof can suitable be used as the raw material (A) for depolymerization in the present invention. In particular, polyamide 6 is a resin substantially only constituted of ε-caprolactam as the monomer units and, therefore, has an advantage in that depolymerization to monomers and purification and separation are easy.

Examples of the form or the polyamide resin include discharged resin scraps, including the portion during the switching between grades in polymerization and the portion during the switching before the start of obtaining film products; film waste scraps, including edge trimming scraps and slit scraps that are generated during film production; films that were not commercialized as defective products, and the like. Using these materials as raw materials makes it possible to contribute to the production of films with excellent printability and the like, and also to contribute to environmental preservation through the use of waste materials.

Examples of the oligomer form include oligomers having high water solubility which are recovered from used water in refining of a polyamide resin, residues after the filtration of the water which contain dimer to octamer having low water solubility, and the like.

The method for producing a monomer from the raw material (A) for depolymerization is not particularly limited as long as the predetermined monomer can be obtained, and a depolymerization reaction of the raw material (A) for depolymerization can be preferably employed. That is, a regenerated monomer can be suitably obtained by chemically decomposing the raw material (A) for depolymerization through a depolymerization reaction.

The method and condition of the depolymerization reaction are not particularly limited, and the depolymerization reaction can be conducted according to a known method. Accordingly, for example, a catalyst may or may not be used. Furthermore, the depolymerization reaction may be conducted in the absence of water (dry method) or the presence of water (wet method). Especially from the viewpoint of productivity, a method conducting depolymerization in hot steam under the presence of a catalyst is preferred. A less water-soluble cyclic oligomer is hard to depolymerize directly because the hydrolysis rate of amide bonds is slow. In contrast, ring-opening polymerization of a cyclic oligomer into chain molecules and subsequent depolymerization under the condition mentioned above allows for suitable production of regenerated monomers even from a cyclic oligomer.

Polymerization Step

In the polymerization step, a polyamide resin (B) is produced by polymerization using a raw material containing the monomer mentioned above (the regenerated monomer).

The raw material may be a raw material in which all monomers therein are regenerated monomers, but a raw material combinedly containing virgin monomers together with regenerated monomers is preferred. A virgin monomer herein is an antonym of a regenerated monomer and refers to a monomer that has not undergone a depolymerization step of polymers. The virgin monomer may be a commercially available product. For example, a monomer normally available on the market can be used as a virgin monomer.

Regenerated monomers may contain hardly-separatable byproducts. This can slightly slow down the rate of crystallization of the polyamide resin made only from a regenerated monomer compared to a polyamide resin made only from a virgin monomer, which allows for the further slowdown of the rate of crystallization of a polyamide resin made from a combination of a regenerated monomer and virgin monomer. A half width is used as an index of the crystallization rate. The half width is determined by measuring the crystallization temperature during cooling (Tc) of the resulting polyamide resin. The half width in the present invention is normally preferably 10° C. or higher, particularly preferably 11° C. or higher, and among them, most preferably 12° C. or higher. The wider the half width, the wider the rate of crystallization, the less likely the film is to have localized irregularities in the crystalline state on the film surface when stretched and crystallized, and the more uniform the film is, which improves the printability of low-gradation portions. From such a viewpoint, it is preferred to use a polyamide resin polymerized from a combination of a regenerated monomer and a virgin monomer. It should be noted that the upper limit of the half width can be set to, for example, about 20° C., but is not limited thereto.

The regenerated monomer content in the raw material is not particularly limited, and the upper limit thereof is preferably set to 90 mass % or less and more preferably 80 mass % or less in view of broadening the half width and the like. The lower limit thereof is not particularly limited and is preferably set to 5 mass % or more, particularly preferably 10 mass % or more in view of increasing the recycling rate.

A virgin monomer is preferably used in combination as a component other than the regenerated monomer. In this case, the virgin monomer content in the raw material is normally preferably about 10 to 95 mass % and particularly preferably 20 to 90 mass %.

For example, ε-caprolactam regenerated by depolymerization reaction of a polyamide 6 resin (hereinafter expressed as "C-CL") may be used within a range close to 100 mass %. Meanwhile, ε-caprolactam as a virgin monomer (hereinafter expressed as "V-CL"), may be contained as a monomer other than C-CL.

In addition, the terminals of the polyamide resin (B) may be optionally capped for the purpose of inhibiting the monomer production during melting. For this reason, the raw material may optionally contain an additive such as a terminal blocking agent. The terminal blocking agent is not particularly limited, and for example, may be an organic glycidyl ester, a dicarboxylic anhydride, a monocarboxylic acid such as benzoic acid, a diamine, and the like.

Polymerization methods themselves for producing a polyamide resin (B) are not particularly limited, and any known method for polymerizing a monomer can be employed. An example that can be employed as the method is a method including mixing ε-caprolactam, water, and benzoic acid as a terminal blocking agent; performing the polymerization reaction while the mixture is heated, pressurized, depressurized, and dehydrated in a polymerization vessel until the viscosity reaches the target value.

Refining Step

In the refining step, the polyamide resin (B) is refined. This allows monomers contained in the polyamide resin to be removed and the relative viscosity of the polyamide resin to be increased to the desired range, which results in properties suitable for film formation.

The refining method is not limited, but the refining is preferably conducted such that the relative viscosity (25° C.) of the polyamide resin (B) is particularly within the range of about 2.5 to 4.5. Accordingly, it is preferred to refine the polyamide resin (B) for 15 to 30 hours using hot water at 90° C. to 100° C., for example.

As refining methods themselves, any known method, such as a method for immersing the polyamide resin (B) in hot water, may be employed. In this case, the polyamide resin (B) may be refined, for example, in the form of a molded body such as pellets.

The refining step may be conducted as a single treatment step, and may optionally be conducted as two or more treatment steps. Sufficient refining allows the monomers contained in a polyamide resin to be eluted more completely into hot water, thus sufficiently lowering the monomer content in the refined polyamide resin.

A polyamide resin after the refining step is preferably dried according to need. The drying condition is not particularly limited. For example, hot-air drying can be conducted at a temperature of about 100° C. to 130° C. for 10 to 30 hours, but is not limited thereto. More specifically, hot-air drying at 110° C. for 20 hours can be conducted.

Filming Step

In the filming step, an unstretched film is prepared from a starting material containing the refined polyamide resin (B) and then stretched.

The starting material may contain a polyamide resin (B) but may optionally contain other components. For example, a remelted resin (D) obtained by melting a polyamide resin (provided that the polyamide resin (B) is excluded) within a range that does not adversely affect the advantages of the present invention in order to increase the cost merit, recycling rate, and the like. In the present invention, resin wastes of a polyamide resin (in particular, a polyamide 6 resin) may be preferably used as the remelted resin (D) from the viewpoint of environmental preservation, effective use of resources, and the like. More specifically, unstretched scraps, edge trimming scraps, slit scraps that are produced during the production of a polyamide resin film, pellets formed by re-melting defective products, and the like may be used.

The content of the remelted resin (D) in the starting material is not particularly limited and is preferably set to 1 mass % or more and particularly preferably 5 mass % or more for increasing the recycling rate. Meanwhile, the upper limit of the content of the remelted resin (D) is normally 75 mass % or less, particularly preferably 65 mass % or less, further preferably 50 mass % or less, still more preferably 40 mass % or less, and among them, most preferably 35 mass % or less. The remelted resin tends to show an increased an amount of terminal in molecular chain, decreased viscosity, and poor quality stability. Therefore, if the content exceeds 75 mass %, the relative viscosity as a film raw material decreases, and foreign substances, thermally degraded substances or the like increase, which tends to cause troubles such as breaking during film formation. In addition, the mechanical properties of a film tend to deteriorate, such as the decrease in tensile elongation. Moreover, the content of caprolactam monomers and oligomers such as dimers, which are generated in the stretching step, increases, which may cause problems, such as localized deterioration in printability in the subsequent steps and increase of the bag breakage rate due to poor adhesiveness. Therefore, the influence on practical performance is concerned.

Film scraps, defective products, and the like used as remelted resins normally contain additives such as lubricants, oxidation prevention agents, and the like, and the content mentioned above shall be a content containing these additives.

The concentration of additives such as lubricants, oxidation prevention agents in film scraps, defective products, and the like varies depending on grades or the like. Therefore, as the content of the remelted resin in the polyamide resin film is higher, the haze, the wetting tension of the film surface, suitability for printing, adhesion properties, and the like of the resulting film may locally be lowered due to variations in the concentration distribution of the additives. For this reason, when the polyamide resin film is composed of a plurality of layers, the remelted resin content in the front surface layer (the outermost layer) is preferably 50 mass % or less, particularly preferably 40 mass % or less, and among them, most preferably 35 mass % or less.

Meanwhile, in an intermediate layer (a layer other than the outermost layer), the remelted resin content can be increased to increase the recycling rate because the characteristics on the film surface, such as wetting tension or printability, are not affected even if the remelted resin content is large. However, the remelted resin content in an intermediate layer is preferably 75 mass % or less because the film haze may increase, and the physical properties such as impact strength tend to deteriorate. The lower limit of the remelted resin content in each layer can be set to, for example, about 5 mass %, but is not limited thereto.

As other components contained in the starting material, a polyamide resin (C) obtained by polymerizing a raw material containing no regenerated monomer but only consisting of virgin monomers may be contained.

When a mixture of a polyamide resin (B) polymerized only from regenerated monomers and a polyamide resin (C) polymerized only from virgin monomers as another resin is used as starting materials and the mixture is melt-extruded, physical properties close to a polyamide resin (B) obtained by polymerizing a combination of regenerated monomers and virgin monomers can be obtained. Meanwhile, from the viewpoint of obtaining more uniform film surface characteristics, it is preferred to polymerize a combination of regenerated monomers and virgin monomers. That is, a polyamide resin (B) constituted of a polymer containing a regenerated monomer and a virgin monomer as monomer units can suitably be used.

The relative viscosity of each polyamide resin contained in the starting material is not limited, but is particularly preferably 2.5 to 4.5, and among them, more preferably within the range of 2.8 to 4.0. If a polyamide resin with a relative viscosity of less than 2.5, film formation and stretching are difficult, and even if a polyamide resin film is obtained, the mechanical characteristics may be significantly lowered. In contrast, film formability may be hindered when a polyamide resin with a relative viscosity over 4.5 is used.

The relative viscosity in the present invention is a value of a sample solution (liquid temperature: 25° C.), prepared by dissolving a resin to be measured in 96% sulfuric acid such that the concentration should be 1.0 g/dl, measured by using an Ubbelohde viscosimeter.

Furthermore, the starting material may optionally include one of, or two or more of various additives such as oxidation prevention agents, UV ray absorbing agents, preservatives, antistatic agents, blocking prevention agents, and inorganic fine particles within a range that does not adversely affect the performance of the film.

Furthermore, a lubricant may be mixed in the starting material for the purpose of improving the slip properties of an obtained film and the like. Both inorganic and organic lubricants can be used as the lubricant. Specific examples of lubricants include clay, talc, calcium carbonate, zinc carbonate, wollastonite, silica, alumina, magnesium oxide, calcium silicate, sodium aluminate, calcium aluminate, magnesium aluminosilicate, glass balloon, carbon black, zinc oxide, antimony trioxide, zeolite, hydrotalcite, layered silicate, ethylene bis-stearamide, and the like. Among them, silica is particularly preferred. The lubricant content is not particularly limited, and the range from 0.01 to 0.3 mass % in the starting material is appropriate.

The method for manufacturing an unstretched film is not limited and may be formed by a known film formation method. For example, an unstretched film may be prepared by extruding the melted material of the raw material from a T-die and cooled on a casting roll. In this case, it is required to control the actual temperature on the casting roll surface with high accuracy from the viewpoint of making the degree of crystallinity of the unstretched film uniform.

In the present invention, if necessary, it is preferred to control the moisture content in an unstretched film to about 2 to 10 mass % (in particular, 4 to 8 mass %) as a moisture control step, and then stretch the unstretched film. If the moisture content is lower than 2 mass %, stretching stress may increase and troubles, such as film breakage, are likely to occur. If the moisture content is higher than 10 mass %, the unevenness of the thicknesses in an unstretched film may be large, and the variation of the thicknesses of the resulting stretched film is also large.

In the moisture control step, in general, when the moisture content of a film is low (especially less than 2 mass %), the moisture content of the film is controlled by passing the film through a moisture control tank at a temperature of 40° C. to 90° C., further preferably 50° C. to 80° C., and adjusting the passing time. Pure water is normally used in the moisture control tank, but the treatment liquid may optionally contain a dye, a surfactant, a plasticizer, and the like. Alternatively, the moisture may be controlled by spraying water vapor. On the other hand, if the moisture content of a film is high (especially more than 10 mass %), the moisture content of the film may be controlled by passing the film through a drying furnace and adjusting the passing time.

Next, the unstretched film is stretched. The way of stretching the unstretched film is not particularly limited, and any stretching method can be employed. In particular, it is preferred to perform biaxial stretching from the viewpoint of preparing a film with excellent tensile elongations both in MD and TD directions.

The biaxial stretching method is not limited, and for example, a simultaneous biaxial stretching method and a sequential biaxial stretching method may be mentioned. For example, the simultaneous biaxial stretching method is preferred in terms of surface balance to reduce the differences between the MD and TD directions in properties such as tensile elongation, elastic modulus, and tensile strength. In contrast, the sequential biaxial stretching method is preferred for improving puncture strength, impact strength, and the like. According to the desired film properties, uses, and the like, these stretching methods may be selected as appropriate.

The draw ratio can be set, as appropriate, according to the use, desired properties, and the like. For example, the draw ratio can be set to 2 to 4 times in the MD direction and 2 to 4 times in the TD direction, although it is not limited thereto. Also, the stretching temperature is not limited, and the stretching cab be conducted, for example, at a temperature within the range of 40° C. to 220° C. In particular, in the case of sequential stretching, the stretching in the MD direction is preferably conducted at a temperature of 40° C. to 80° C., and the stretching in the TD direction is preferably conducted at a temperature of 80° C. to 150° C. In the case of simultaneous biaxial stretching, the temperature is preferably set to 160° C. to 220° C.

The resulting biaxially-stretched film is preferably subjected to short-time heat treatment at about 150° C. to 220° C. according to need in order to improve dimension stability and reduce hot water shrinkage.

Furthermore, the polyamide resin film of the present invention may be subjected to surface treatment such as corona discharge treatment and adhesiveness-increasing treatment in a range that does not substantially adversely affect the advantages of the present invention. For example, a highly-adhesive layer, a barrier coat layer, a printing layer, and the like can be disposed as appropriate.

The polyamide resin film of the present invention obtained in this way can optionally be provided as a laminated body laminated with another layer.

Furthermore, a film comprising a plurality of layers may be formed by simultaneous melt extrusion, lamination, of the like in the manufacturing stage of the polyamide resin film. For example, the polyamide resin film may have a two-type two-layer constitution, in which a polyamide resin film containing a polyamide 6 resin obtained by polymerizing a regenerated monomer and a polyamide 6 resin film containing a remelted resin, a two-type three-layer constitution, in which polyamide resin films containing a polyamide 6 resin film obtained by polymerizing a regenerated monomer sandwich a polyamide 6 resin film containing a remelted resin, and the like. A polyamide 6 resin film having a constitution that can sandwich an intermediate layer, such as the two-type three-layer constitution, can increase the remelted resin content in the intermediate layer.

2. Polyimide Resin Film

The present invention includes a polyamide resin film, wherein when the film is halftone-printed, the halftone-printed film includes 100 or fewer missing dots in 1000 mm$^2$ of a 10% gradation part in a halftone-printed film.

(1) Composition of Polyamide Resin Film

The composition of the polyamide resin is not particularly limited; for example, a polyamide 6 resin made from lactams such as ε-caprolactam may be mentioned. Examples of other polyamide resins include polyamide resins obtained by polycondensing lactams with 3 or more membered ring, w-amino acids, dibasic acids, diamines, and the like.

More specifically, examples of the lactams include ε-caprolactam mentioned above, and enantolactam, capryllactam, lauryl lactam, and the like.

Examples of the ω-amino acids include 6-aminocaproic acid, 7-aminoheptanoic acid, 9-aminononanoic acid, 11-aminoundecanoic acid, and the like.

Examples of the dibasic acids include adipic acid, glutaric acid, pimelic acid, suberic acid, azelaic acid, sebacic acid, undecanedioic acid, dodecanedioic acid, hexadecanedioic acid, eicosanedioic acid, eicosadienedioic acid, 2,2,4-trimethyladipic acid, terephthalic acid, isophthalic acid, 2,6-naphthalenedicarboxylic acid, xylylene dicarboxylic acid, and the like.

Examples of diamines include ethylene diamine, trimethylene diamine, tetramethylene diamine, hexamethylene diamine, pentamethylene diamine, undecamethylene diamine, 2,2,4 (or 2,4,4)-trimethylhexamethylene diamine, cyclohexanediamine, bis-(4,4'-aminocyclohexyl)methane, m-xylylene diamine, nonane diamine, decane diamine, and the like.

Examples of the polymers and copolymers that can be obtained by polycondensing these monomers include polyamides 6, 7, 10, 11, 12, 4.10, 5.6, 6.6, 6.9, 6.10, 6.11, 6.12, 10.10, 6T, 9T, 10T, 6I, MXD6 (m-xylylene diadipamide 6), 6/6.6, 6/12, 6/6T, 6/6I, 6/MXD6, and the like. Among them, polyamide 6 resins are preferred in the present invention in view of the fact that the balance between heat resistance and mechanical characteristics is excellent. That is, the polyamide resin film of the present invention is preferably a polyamide 6 resin film.

(2) Properties of Polyimide Resin Film

The polyamide resin film of the present invention has a printability that, when the film is halftone-printed, the halftone-printed film includes 100 or fewer missing dots in 1000 mm$^2$ of a 10% gradation part in the halftone-printed film. A film having such characteristics is advantageous upon printing because of the appearance after printing and high reproducibility, especially in a light color portion among deep and light color portions. The number of the missing dots is preferably 80 dots or fewer, more preferably 70 dots or fewer, and among them, most preferably 60 dots or fewer. If the above number exceeds 100 dots, the irregularities are visually observed even in low-gradation portions by gazing at the area, and individual differences in the pattern can be felt, which may be judged to be a printing defect. The lower limit of the above number is most preferably 0. For example, the number of missing dots may be about 30, although it is not limited thereto.

The polyamide resin film of the present invention has a relative viscosity ηR of preferably within the range of 2.5 to 4.5 and more preferably within the range of 2.8 to 4.0. The relative viscosity in the present invention is a value of a sample solution (liquid temperature: 25° C.), prepared by dissolving a film to be measured in 96% sulfuric acid such that the concentration should be 1.0 g/dl, measured by using an Ubbelohde viscosimeter. A polyamide resin film having a relative viscosity of less than 2.5 may show significantly deteriorated dynamic characteristics, or the evaluation thereof in the bag drop test regarding the laminated film, which will be mentioned later, may be lowered. In addition, a polyamide resin film having a relative viscosity exceeding 4.5 is likely to show insufficient film thickness uniformity and may cause irregularities in mechanical characteristics.

The accuracy in thickness of the polyamide resin film of the present invention is preferably within the range of plus or minus 15% with respect to the target thickness and particularly preferably within the range of plus or minus 10% with respect to the target thickness.

The extracted amount of caprolactam monomers from the polyamide resin film of the present invention is preferably 1.6 mass % or less, more preferably 1.0 mass % or less, still more preferably 0.5 mass % or less, and among them, most preferably 0.1 mass % or less. If the extracted volume of caprolactam monomers from a film exceeds 1.6 mass %, the wettability of polyamide resin film surface is more likely to vary. Furthermore, the adhesive performance between the polyamide resin film and another resin layer or ink may be locally lowered, resulting in deterioration of practical performances, for example, a decrease in number up to breakage of bags in a bag drop test.

The polyamide resin film of the present invention has a terminal amino group content and a terminal carboxyl group content in the polyamide resin film of preferably 80 mmol/kg or less, most preferably 70 mmol/kg or less, respectively. If either of the terminal amino group and terminal carboxyl group content exceeds 80 mmol/kg, the crystallization rate of the film may be increased, and the local unevenness in the degree of crystallinity are more likely to occur. This may decrease the local printability of the film and is likely to decrease the tensile elongation and cause unevenness in properties such as impact strength, and even may partially decrease the properties.

The polyamide resin film of the present invention shows a ratio (minimum/maximum) between a maximum and a minimum of film impact strengths under an atmosphere at a temperature of 23° C. and a humidity of 50% RH of preferably 0.5 to 1.0, particularly preferably 0.6 to 1.0, and among them, most preferably 0.7 to 1.0. It is considered that there is a partial reduction in the impact resistance of the film when the above ratio is less than 0.5, which is not desirable from a practical standpoint.

The tensile elongations in both MD and TD directions are preferably 60% or more and particularly preferably 70% or more.

The polyamide resin film of the present invention preferably has a haze value of 10.0% or less, particularly 7.0% or less, and among them, most preferably 6.0% or less.

The polyamide resin film of the present invention is preferably a film obtained by the "1. Production Method of Polyamide Resin Film". That is, a film produced using a raw material including a regenerated monomer is preferred. Accordingly, the polyamide resin film of the present invention is preferably a stretched film (in particular, biaxially stretched film). This ensures obtaining each of the above properties more reliably.

Accordingly, the polyamide resin film of the present invention may be constituted of a single polyamide resin film obtained by polymerizing a regenerated monomer, or may be a mixture of two or more resins, or may be a polyamide resin film containing a remelted resin as mentioned later. Furthermore, the polyamide resin film may be constituted of a single layer, or a film may be constituted of a plurality of layers formed by simultaneous melt extrusion or lamination. For example, the polyamide resin film may have any of a two-type two-layer constitution, in which a polyamide resin film containing a polyamide resin obtained by polymerizing a regenerated monomer and a polyamide resin film containing a remelted resin, a two-type three-layer constitution, in which polyamide resin films containing a polyamide resin film obtained by polymerizing a regenerated monomer sandwich a polyamide resin film containing a remelted resin, and the like. If the film is composed of a plurality of layers, at least one outermost layer preferably contains a polyamide resin obtained by polymerizing a regenerated monomer.

(3) Use of Polyamide Resin Film

The polyamide resin film (especially a biaxially-stretched polyamide resin film) obtained as above has excellent transparency, color tone, wettability, suitability for printing, and the like, in addition to excellent mechanical properties such as excellent tensile elongation, tensile strength, and elastic modulus, and therefore, can be used particularly as a packaging material.

The polyamide resin film of the present invention may be used singly or in the form of a laminated body laminated with another layer. For example, an easy-adhesive layer, a barrier coat layer, a printing layer, an adhesive layer, and the like can be disposed as appropriate.

The polyamide resin film of the present invention may be used as a packaging bag (pouch body) by laminating the film with a sealant layer made from polyolefin or the like to form a laminated film by a known method such as a dry lamination method or an extrusion lamination method, and heat-sealing opposing the sealant layers of the laminate films. For example, any form such as a two-sided bag, a three-sided bag, a butt-seam bag, a gazette bag, a side seal bag, a standing bag, or a standing zipper bag can be employed as the bag.

Also, the object to be packed (contents) is not limited, and the packaging bag can be used as a packaging material for a wide range of products, including food and beverages, pharmaceuticals, cosmetics, chemicals, and sundries, for example.

The present invention encompasses a laminated film including the polyamide resin film of the present invention and a sealant resin layer laminated on the polyamide resin film. Such a laminated film may be suitably used as a packaging material or a package. The polyamide resin film of the present invention has a uniform surface state, exhibits little local precipitation of additives, monomers, and the like, and causes no local decrease in adhesion, and therefore, the resulting package obtained shows excellent bag breakage resistance. For example, a package filled with water may be torn from a weak portion when the bag is dropped, and additionally, the bag may be delaminated and torn from a portion where the local adhesiveness is low. In contrast, the laminated film of the present invention has an advantage that a bag is harder to break than ready-made products.

More specifically, the laminated film of the present invention preferably shows a dropping number up to bag breaking of 50 times or more, preferably 60 times or more, and further preferably 70 times or more in a bag drop test under an atmosphere at 25° C. and 55% RH. The bag drop test is carried out by dropping a package (heat-sealed with a width of 10 mm using two laminated bodies with a size of 200 mm×300 mm), filled with 1000 ml of water and 10 ml of air, from the height of 1.2 m.

EXAMPLES

The characteristic of the present invention will be further specifically described while showing Examples and Comparative Examples. However, the scope of the present invention is not limited to these examples.

1. Raw Material Used

The raw materials used in Examples and Comparative Examples are as follows. Table 1 shows the time required for polymerization reaction and the total treatment time of refining in the preparation of each raw material, as well as the relative viscosities ($\eta R$), crystallization temperatures during cooling (Tc) and the half widths thereof, and monomer content (caprolactam content) of resulting raw materials.

Raw Materials B2 to B4

Film scraps or defective products generated during the production of a polyamide 6 resin film, and resin scraps (resin waste) containing oligomers produced during polymerization of a polyamide 6 resin were used as the raw material (A) for depolymerization. Phosphoric acid was added to a raw material (A) for depolymerization, then a depolymerization reaction was conducted by a wet method under heating, and the reaction mixture was purified through activated carbon treatment, concentration, and distillation to recover regenerated ε-caprolactam "C-CL". On the other hand, "V-CL" is ε-caprolactam which is a virgin monomer.

C-CL and V-CL were blended so as to be the ratios (mass ratios) shown in Table 1, then the blended mixture was mixed with water and benzoic acid as a terminal blocking agent, and the mixture was heated, pressurized, depressurized, and dehydrated in a polymerization vessel, and after that, the polymerization reaction was promoted until the viscosity reached the target viscosity. Required polymerization time for obtaining the final target viscosity varies depending on the proportion of the CL species. Each polymerization time was listed in Table 1. The resulting polymerization product (resin) was pelletized, then refined by hot water treatment at 95° C. twice in total for 10 hours and for another 15 hours, and dried at 110° C. for 20 hours. Polyamide resins (raw materials B2 to B4) with a relative viscosity of 3.1 were obtained in this way.

Raw Material D

Film wastes generated during the production of a polyamide 6 resin film was pulverized, then re-melted at 250° C. to 290° C., and pelletized. After that, the resulting pellets were dried. A remelted resin (raw material D) was obtained in this way. The relative viscosity of the remelted resin was 2.9.

Silica Master E (Silica-Containing Polyamide Resin, Containing 6 mass % Silica)

For producing a master chip, PCM-30, manufactured by IKEGAI CORP., was charged with A1030 BRF (a polyamide 6 resin, manufactured by Unitika Ltd.)/silica 1 (SILYSIA 310P, average particle diameter: 1.4 μm, manufactured by Fuji Silysia Chemical Ltd.)/silica 2 (MIZUKASIL P73, average particle diameter: 2.5 μm, manufactured by Mizusawa Industrial Chemicals, Ltd.) in the ratio of 94.0/4.5/1.5 (mass ratio) from a supply port, and the content was melt-kneaded at a condition of a cylinder temperature of 230° C. to 270° C., a screw rotation number of 200 rpm, and a discharge amount of 10 kg/hour. The resulting melt-kneaded product was pelletized and vacuum dried (80° C. for 24 hours). A silica master E was obtained in this way. The relative viscosity of the silica master was 3.0.

TABLE 1

| Resin | | Polymerization time | Total refining time | Relative viscosity | Caprolactam content | Crystallization temp. during cooling | |
|---|---|---|---|---|---|---|---|
| | (mass %) | (h) | (h) | η R | (mass %) | Tc (° C.) | Half width (° C.) |
| B1 | C—CL resin 100 | 16.0 | 25.0 | 3.0 | 0.12 | 172.2 | 10 |
| B2 | C—CL/V—CL 20/80 | 14.0 | 25.0 | 3.1 | 0.15 | 172.5 | 13 |
| B3 | C—CL/V—CL 40/60 | 15.0 | 25.0 | 3.1 | 0.14 | 171.7 | 14 |
| B4 | C—CL/V—CL 90/10 | 15.7 | 25.0 | 3.1 | 0.13 | 171.9 | 11 |
| B5 | C—CL resin 100 | 16.0 | 18.0 | 2.7 | 0.19 | 172.0 | 11 |
| B6 | C—CL resin 100 | 16.0 | 10.0 | 2.4 | 0.24 | 172.0 | 11 |
| C | V—CL resin 100 | 13.5 | 20.0 | 3.1 | 0.19 | 173.0 | 9 |
| D | Remelted resin 100 | — | — | 2.9 | 0.29 | 185.7 | 4 |

Raw Materials B1 and B5

Polymerization was conducted in the same manner as above using C-CL, water, and benzoic acid as a terminal blocking agent, then pelletized, refined by hot water treatment at 95° C. twice in total for 10 hours and for another 15 hours, and dried at 110° C. for 20 hours. A polyamide resin (B1) with a relative viscosity of 3.0 was obtained in this way.

Furthermore, polymerization was conducted in the same condition as polyamide resin (B1), the polymerized product was then pelletized, refined by hot water treatment at 95° C. for 18 hours, and dried at 110° C. for 20 hours. A polyamide resin (raw material B5) with a relative viscosity of 2.7 was obtained in this way.

Raw Material B6

Polymerization was conducted in the same condition as the raw material B1, the polymerized product was then pelletized, refined by hot water treatment at 95° C. for 10 hours, and dried at 110° C. for 20 hours. A polyamide resin (raw material B6) with a relative viscosity of 2.4 was obtained in this way.

Raw Material C

Polymerization was conducted in the same step using V-CL, water, and benzoic acid as a terminal blocking agent, then pelletized, refined by hot water treatment at 95° C. twice in total for 10 hours and for another 10 hours, and dried at 110° C. for 20 hours. A polyamide resin (raw material C) with a relative viscosity of 3.1 was obtained in this way.

2. Examples and Comparative Examples

Films are prepared using the raw materials listed in section 1. mentioned above.

Example 1

As the composition of a polyamide resin film, 97.5 mass % of a polyamide resin obtained by polymerizing only C-CL (raw material B1) and 2.5 mass % of silica master were mixed, then melt-kneaded in an extruder, supplied to a T-die and discharged in a sheet form, and the resulting sheet was wound around a metal drum that was temperature-controlled to 20° C., and then cooled and rolled up to obtain an unstretched film with a thickness of about 150 μm. Next, the resulting unstretched film was immersed in a moisture control tank, which was controlled to 50° C., for 1 minute, then the edges of the unstretched film were held with clips of a tenter-type simultaneous biaxial stretching device, and the unstretched film was subjected to simultaneous biaxial stretching under a condition at 180° C. and draw ratios in the MD direction of 3.0 times and in the TD direction of 3.3 times. Thereafter, the stretched film was subjected to heat treatment at 201° C. for four seconds at a relaxation ratio in the TD direction of 5%, then gradually cooled to room temperature, and corona discharge treatment was conducted on one surface of the film. After that, the film was rolled up to obtain a biaxially stretched polyamide resin film with a thickness of 15 µm. The total regeneration ratio in this film was 97.5 mass %. The moisture content of the unstretched film was 5 mass %.

Example 2

A biaxially stretched polyamide resin film with a thickness of 15 µm was obtained in the same manner as in Example 1, except that 97.5 mass % of a polyamide resin (raw material B5) indicated in Table 1 was used as the composition of the polyamide resin film. The total regeneration ratio in this film was 97.5 mass %.

Examples 3, 5, and 13

Biaxially stretched polyamide resin films with a thickness of 15 µm were obtained in the same manner as in Example 1, except that 97.5% of a polyamide resin (raw material B4) or (raw material B3) or (raw material B2) in Table 1 was used as indicated in Table 2 as the composition of the polyamide resin film. The total regeneration ratios in these films were 87.8 mass %, 39.0 mass %, and 19.5 mass %, respectively.

Examples 4, 11, and 18

Biaxially stretched polyamide resin films with a thickness of 15 µm were obtained in the same manner as in Example 1, except that a polyamide resin (raw material B1) and a polyamide resin (raw material C) in Table 1 were blended according to the proportions as indicated in Table 2, and 97.5% of these blended resins were used as the composition of the polyamide resin film.

Examples 6, 7, 9, 10, 16, and 17

Biaxially stretched polyamide resin films with a thickness of 15 µm were obtained in the same manner as in Example 1, except that a polyamide resin (raw material B1), a polyamide resin (raw material C), and a remelted resin (raw material D) in Table 1 were blended according to the proportions as indicated in Table 2, and 97.5 mass % of these blended resins were used as the composition of the polyamide resin film.

Example 8

A biaxially stretched polyamide resin film with a thickness of 15 µm was obtained in the same manner as in Example 1, except that a polyamide resin (raw material B3) and a remelted resin (raw material D) in Table 1 were blended according to the proportions as indicated in Table 2, and 97.5 mass % of these blended resins were used as the composition of the polyamide resin film.

Examples 14 and 15

Biaxially stretched polyamide resin films with thicknesses of 15 µm were obtained in the same manner as in Example 1, except that a polyamide resin (raw material B2) and a remelted resin (raw material D) in Table 1 were blended according to the proportions as indicated in Table 2, and 97.5 mass % of these blended resins were used as the composition of the polyamide resin film.

Example 12

A polyamide resin (raw material B1) and a polyamide resin (raw material C) in Table 1 were blended according to the proportions as indicated in Table 2 as the composition of the polyamide resin film, then 97.5 mass % of these blended resins and 2.5 mass % of a silica master were mixed, and an unstretched film was obtained in the same manner as in Example 1. Next, the unstretched film was stretched in the MD direction at 2.8 times with a temperature-controlled roll at 55° C., the resulting film was held with clips, and the film was then stretched in the TD direction at 3.7 times under the condition at 185° C. (sequential biaxial stretching). Thereafter, the stretched film was subjected to heat treatment at 201° C. for four seconds at a relaxation ratio in the TD direction of 5%, then gradually cooled to room temperature, and corona discharge treatment was conducted on one surface of the film. After that, the film was rolled up to obtain a biaxially stretched polyamide resin film with a thickness of 15 µm. The total regeneration ratio in this film was 19.5 mass %. The moisture content of the unstretched film was 0.5 mass %.

Example 19

A two-type three-layer constitution film at a thickness ratio of 1:1:1 was formed as a polyamide resin film. As an intermediate layer, a resin of a mixture of 25 mass % of a polyamide resin (raw material C) and 75 mass % of a remelted resin (raw material D) in Table 1 was disposed. The polyamide resin (B3) in Table 1 was disposed as both outer layers. An unstretched film was obtained in the same manner as in Example 1, except that 2.5 mass % of a silica master was mixed in each layer and co-extruded. The resulting unstretched film was subjected to simultaneous biaxial stretching to obtain a biaxially stretched polyamide resin film with a thickness of 15 µm. The total regeneration ratio in this film was 50.4 mass %.

Comparative Example 1

A biaxially stretched polyamide resin film with a thickness of 15 µm was obtained in the same manner as in Example 1, except that 97.5 mass % of a polyamide resin (B6) in Table 1 was used as the composition of the polyamide resin film.

Comparative Example 2

A biaxially stretched polyamide resin film with a thickness of 15 µm was obtained in the same manner as in Example 1, except that 97.5 mass % of a remelted resin (D) was used as the composition of the polyamide resin film.

Comparative Example 3

A biaxially stretched polyamide resin film with a thickness of 15 µm was obtained in the same manner as in Example 12, except that 97.5 mass % of a remelted resin (D) was used as the composition of the polyamide resin film.

Comparative Examples 4 and 5

Biaxially stretched polyamide resin films with thicknesses of 15 µm were obtained in the same manner as in Example 1, except that a polyamide resin (C) and a remelted resin (D) were blended according to the proportions as indicated in Table 2, and 97.5 mass % of these blended resins were used as the composition of the polyamide resin film.

Comparative Example 6

A biaxially stretched polyamide resin film with a thickness of 15 µm was obtained in the same manner as in Example 1, except that 97.5 mass % of a polyamide resin (C) was used as the composition of the polyamide resin film.

Comparative Example 7

As the composition of a polyamide resin film, 97.5 mass % of a polyamide resin (C) and 2.5 mass % of a master chip (E) were mixed, then melt-kneaded in an extruder, supplied to a T-die and discharged in a sheet form, and the resulting sheet was wound around a metal drum that had been temperature-controlled to 20° C., and then cooled and rolled up to obtain an unstretched film with a thickness of about 150 μm. At this time, variations in the actual temperature on the metal drum that had been temperature-controlled to 20° C. were observed, and unevenness of crystallinity of the unstretched film were also observed. A biaxially stretched polyamide resin film with a thickness of 15 μm was obtained in the same manner as in Example 1 except for the above matters. Portions where the thickness accuracy exceeded plus or minus 15% were observed in the resulting film.

Examples were each used as a sample, and the relative viscosity of a sample solution (liquid temperature: 25° C.), prepared by dissolving the sample in 96% sulfuric acid at a concentration of 1.0 g/dl, was measured using an Ubbelohde viscosimeter.

(2) Moisture Content

An unstretched film after water absorption treatment or just before stretching was sampled, then put in a weighing bottle and dried, and the moisture content was calculated from the difference in mass before and after drying.

(3) Caprolactam Monomer Content

[Preparation of Measurement Sample]

The raw material polyamide resins (raw materials B1 to D) and the films obtained in Examples and Comparative Examples were freeze-pulverized, then 0.5 g of the pulverized material was precisely weighed and put in a 10-ml headspace bottle, then 10 ml of ultrapure water was added to the bottle, then the bottle was sealed with a butyl rubber stopper and an aluminum cap, and the caprolactam mono-

TABLE 2

| | Raw Material (other than E) | Raw material (other than E) proportion in film | | remelted resin D content (mass %) | Silica master E (mass %) | Total regeneration ratio in film (mass %) | Stretching method etc. |
|---|---|---|---|---|---|---|---|
| | | monomer proportion (mass %) | | | | | |
| | | C—CL | V—CL | | | | |
| Ex. 1 | B1 | 100 | 0 | 0 | 2.5 | 97.5 | Simultaneous |
| Ex. 2 | B5 | 100 | 0 | 0 | 2.5 | 97.5 | Simultaneous |
| Ex. 3 | B4 | 90 | 10 | 0 | 2.5 | 87.8 | Simultaneous |
| Ex. 4 | B1/C | 40 | 60 | 0 | 2.5 | 39.0 | Simultaneous |
| Ex. 5 | B3 | 40 | 60 | 0 | 2.5 | 39.0 | Simultaneous |
| Ex. 6 | B1/C/D | 30 | 40 | 30 | 2.5 | 58.5 | Simultaneous |
| Ex. 7 | B1/C/D | 30 | 60 | 10 | 2.5 | 39.0 | Simultaneous |
| Ex. 8 | B3/D | 28 | 42 | 30 | 2.5 | 56.6 | Simultaneous |
| Ex. 9 | B1/C/D | 20 | 40 | 40 | 2.5 | 58.5 | Simultaneous |
| Ex. 10 | B1/C/D | 20 | 60 | 20 | 2.5 | 39.0 | Simultaneous |
| Ex. 11 | B1/C | 20 | 80 | 0 | 2.5 | 19.5 | Simultaneous |
| Ex. 12 | B1/C | 20 | 80 | 0 | 2.5 | 19.5 | Sequential |
| Ex. 13 | B2 | 20 | 80 | 0 | 2.5 | 19.5 | Simultaneous |
| Ex. 14 | B2/D | 16 | 64 | 20 | 2.5 | 35.1 | Simultaneous |
| Ex. 15 | B2/D | 14 | 56 | 30 | 2.5 | 42.9 | Simultaneous |
| Ex. 16 | B1/C/D | 10 | 60 | 30 | 2.5 | 39.0 | Simultaneous |
| Ex. 17 | B1/C/D | 10 | 80 | 10 | 2.5 | 19.5 | Simultaneous |
| Ex. 18 | B1/C | 5 | 95 | 0 | 2.5 | 4.9 | Simultaneous |
| Ex. 19 | (Outer layer) B3 (inner) D75% C25% | 26.7 | 48.3 | 25 | 2.5 | 50.4 | Simultaneous (Multilayer 1/1/1) |
| Com.Ex.1 | 86 | 100 | 0 | 0 | 2.5 | 97.5 | Simultaneous |
| Com.Ex.2 | D | 0 | 0 | 100 | 2.5 | 97.5 | Simultaneous |
| Com.Ex3 | D | 0 | 0 | 100 | 2.5 | 97.5 | Sequential |
| Com.Ex.4 | C/D | 0 | 50 | 50 | 2.5 | 48.8 | Simultaneous |
| Com.Ex.5 | C/D | 0 | 70 | 30 | 2.5 | 29.3 | Simultaneous |
| Com.Ex.6 | C | 0 | 100 | 0 | 2.5 | 0.0 | Simultaneous |
| Com.Ex.7 | C | 0 | 100 | 0 | 2.5 | 0.0 | CR temperature accuracy insufficient |

Test Example 1

The following properties were examined on the raw material polyamide resins (raw materials B1 to D) and the films obtained in Examples and Comparative Examples. Table 3 shows the results. Samples left under an environment at a temperature of 23° C. and a humidity of 50% RH for two hours or longer were used in the measurements, and the properties were measured under an atmosphere at a temperature of 23° C. and a humidity of 50% RH.

(1) Relative Viscosity ηR

The raw material polyamide resins (raw materials B1 to D) and the films obtained in Examples and Comparative mers were extracted for two hours in a boiling water bath (100° C.). This content was cooled and filtrated with a 0.45-μm disk filter, and the resulting filtrate was used as a measurement sample.

[Production of Calibration Curve]

Caprolactam, 0.1 g, was dissolved in 100 ml of ultrapure water to prepare a 1000-ppm solution, then this solution was further diluted to prepare standard solutions at 100, 50, 20, 10, 5, and 2 ppm, respectively, and a calibration curve was created.

[HPLC Condition]

Device: HP 1100 HPLC system, manufactured by Hewlett-Packard Company; column: Waters Pureisil 5 μm C18 120

Å, 4.6 mm×250 mm (40° C.), detector: UV 210 nm, injection amount: 10 µl, flow rate: 0.7 ml/min, elution: elution was conducted for 12 minutes with a methanol/water (volume ratio: 35/75) solution, thereafter the eluent was changed to a methanol/water (volume ratio: 100/0) solution over 3 minutes and elution was conducted for another 30 minutes, and thereafter, the eluent was changed to a methanol/water (volume ratio: 35/75) solution over 5 minutes and the elution was conducted for further 20 minutes.

[Calculation Method]

The mass of monomers in a sample was calculated from the monomer concentration of samples detected in the above conditions, and the values obtained by dividing the monomer mass by the mass of the measurement sample were used as a monomer extracted amount (mass %).

(4) Crystallization Temperatures During Cooling (Tc) and Half Width

Crystallization temperatures during cooling (Tc) were measured using a differential scanning calorimeter (input compensation type DSC 8000), manufactured by Perkin-Elmer Corp., by weighing 10 mg of the resulting resin, then raising the temperature from room temperature to 260° C. at a temperature rising rate of 10° C./min, keeping the temperature at 260° C. for 10 minutes, and cooling the resin to 100° C. at a cooling rate of 10° C./min. In the DSC curve with heat flows (mW) on the ordinate axis and temperatures on the abscissa axis, the temperature at the top of the peak during cooling was taken as Tc (° C.), and the interval between two points at the half intensity of the absolute value of Tc after drawing the baseline from the high-temperature side was taken as a half width (° C.).

(5) Terminal Amino Group Content

The films obtained in Examples and Comparative Examples were dissolved in a solvent (phenol/ethanol=4/1 in terms of a volume ratio), then a certain amount of 0.02-N hydrochloric acid was added thereto, and the solution was back-titrated with a 0.02-N aqueous sodium hydroxide solution.

(6) Terminal Carboxyl Group Content

The films obtained in Examples and Comparative Examples were dissolved in benzyl alcohol at 180° C., a phenolphthalein indicator was added to the resulting solution, and the solution was titrated with a 0.02-N solution of potassium hydroxide in ethanol.

(7) Evaluation of Number of Missing Dots in 10% Gradation Portion/Evaluation of Extensibility of 40% Gradation Portion upon Halftone Printing

[Printing Step]

Printing ink was prepared by mixing a diluent NKFS102 (manufactured by TOYO INK CO., LTD.) in LIOALPHA R39 Indigo (manufactured by TOYO INK CO., LTD.) and adjusting the viscosity (23° C.) of the ink such that the Zahn's Cup factor according to #3 should be 15 seconds. A printing roll film was prepared by slitting a film at positions 500 mm away from the center leftward and rightward in the TD direction. Using an helio-engraving gradation-changed plate for gravure printing, the ink was applied to a film, dried at 50° C. for 10 seconds, and the film was rolled up to produce a printed film.

This gradation-changed plate is a plate helio-engraved in 175 lines (175 halftone dots (dots) per inch width) with gradations of 10%, 20%, 30%, 40%, and 100% in the MD direction in this order. The depth of each gradation was 2.5 µm, 5.0 µm, 7.5 µm, 10.0 µm, and 32.0 µm, respectively, the printed length in the MD direction for each gradation was 60 mm, and the printed width in the TD direction was 0.8 m.

The main composition of LIOALPHA R39 Indigo contains 10 mass % of a pigment, 15 mass % of a synthetic resin, 2.5 mass % of silica, 30 mass % of ethyl acetate, 15 mass % of isopropyl alcohol, 10 mass % of propyl acetate, 10 mass % of propylene glycol monomethyl ether, and 5 mass % of n-propyl alcohol.

The main composition of Diluent NKFS 102 mainly contains 50 mass % of ethyl acetate, 35 mass % of propyl acetate, 10 mass % of isopropyl alcohol, and 5 mass % of n-propyl alcohol.

[Evaluation on Number of Missing Dots]

The number of missing dots was evaluated by sampling a total of 10 areas from the 10% gradation portion on the prepared printed film and magnified 8 times with a stereo microscope ZEISS SteREO Discovery. V12 (manufactured by ZEISS) and the number of missing dots (that is, areas that had not been able to be printed) was counted in a region with a total area of 1000 $mm^2$ (47500 dots in total) of 20 mm in the MD direction and 50 mm in the TD direction. The same evaluation was performed at 10 sampled regions, and the value with the highest number of missing dots among all 10 regions is shown in Table 3.

Figure 1:
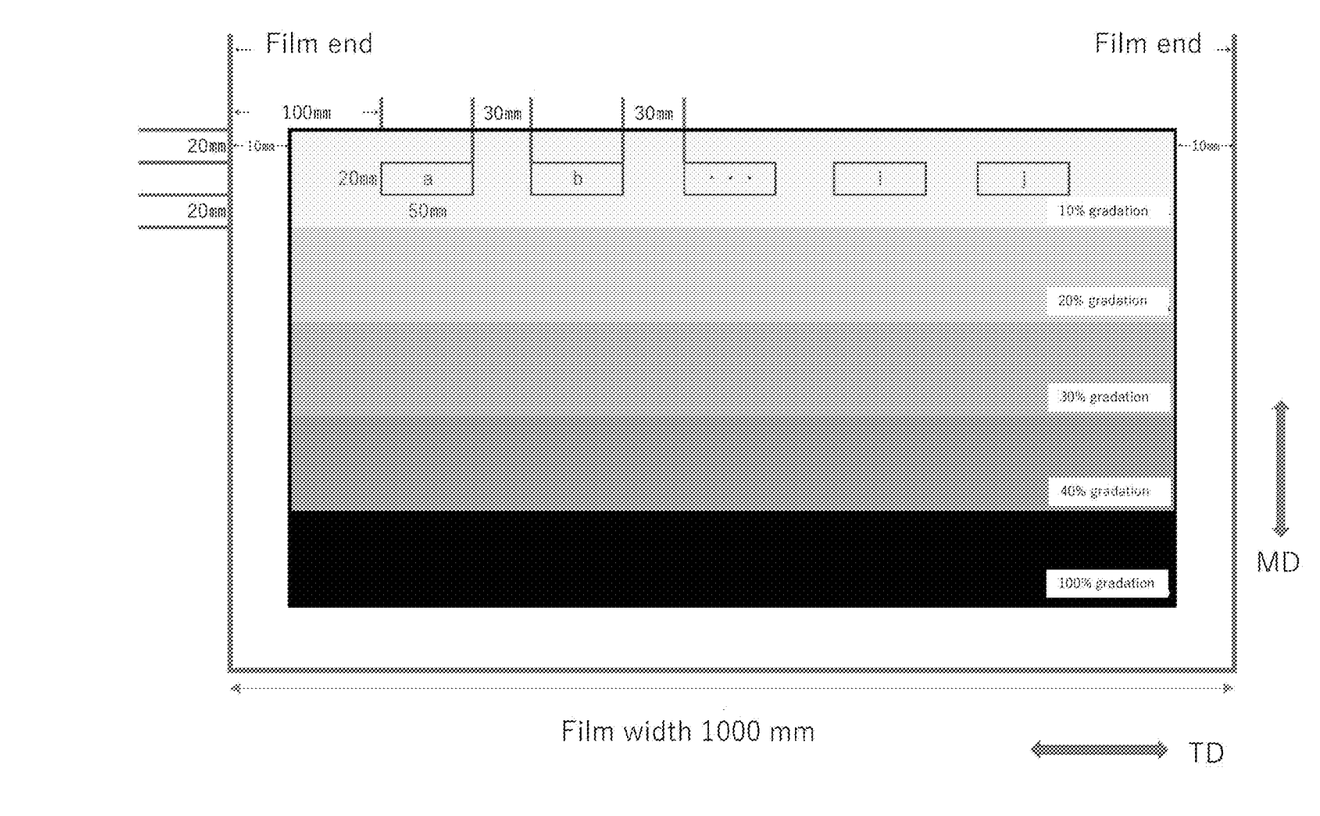
FIG. 1 is a diagram illustrating the outline of the method for evaluating the printability of a polyamide resin film of the present invention.

FIG. 1 indicates the outline of the measurement method. In the printing section with 10% gradation, the regions for evaluation were set in the area within the remaining 20 mm portions excluding the upper and lower ends 20 mm in the MD direction, and a region with a length of 50 mm from the starting point, which was positioned 100 mm apart from the film edge in the TD direction, the area was set as the first region. And a total of 10 regions at 30 mm intervals were evaluated. That is, as illustrated in FIG. 1, 10 measurement regions a to j having a size of 20 mm×50 mm were set to evaluation targets.

The number of missing dots may be 100 dots or fewer for practical use in the total (47500) dots, but is preferably 80 dots or fewer, further preferably 70 dots or fewer, and among them, most preferably 60 dots or fewer. If the above number exceeds 100 dots, the irregularities can be visually observed even in low-gradation portions by gazing at the area, and individual differences in the pattern can be felt, which may be judged to be a printing defect.

[Evaluation on Extensibility]

A 40% gradation portion of the prepared printed film was magnified 20 times using a stereo microscope ZEISS SteREO Discovery. V12 (manufactured by ZEISS), the shapes of the halftone dots were observed, and the halftone dot diameters were measured at an arbitrary 10 points. The evaluation was made at three levels according to the following evaluation criteria.

(Evaluation Standard)

⊚ No problems were observed in the shape of the halftone dots, and the ratio between the minimum to the maximum of the halftone dot diameters was 0.9 or more and 1 or less.

◯ No problems were observed in the shape of the halftone dots, and the ratio between the minimum to the maximum of the halftone dot diameters was 0.85 or more and less than 0.9.

Δ Slight distortions were observed in the shape of the halftone dots, and the ratio between the minimum to the maximum of the halftone dot diameters was 0.75 or more and less than 0.85.

x The shape of the halftone dots was distorted, and irregularities in the size of the halftone dots were observed; the ratio between the minimum to the maximum of the halftone dot diameters was less than 0.75.

(8) Impact Strength (J)

Samples were prepared by cutting the resulting polyamide resin film in size with a width of 10 cm and a length of 150 cm at the center of the film and positions 50 cm away from the center leftward and rightward in the TD direction, respectively. A film impact tester, manufactured by Toyo Seiki Seisaku-sho, Ltd., was used with a ½-inch hemispherical head, and a sample was fixed by clamping in a jig with a 50 cmφ circular hole, and the impact strength was measured 15 times each. Ratios (minimum/maximum) between the maximum and the minimum of impact strengths are shown in Table 2. The above ratio is preferably 0.5 to 1.0, more preferably 0.6 to 1.0, and further preferably 0.7 to 1.0. It is considered that there is a partial reduction in the impact resistance of the film when the above ratio is less than 0.5, which is not desirable from a practical standpoint.

(10) Tensile Elongation (%)

Using a DSS-500 autograph manufactured by Shimadzu Corporation, tensile elongation was measured in accordance with the Japanese Industrial Standard JIS K 7127. A region with a width of 10 mm and a length of 150 mm in the MD direction was cut at the center in the TD direction of the resulting polyamide resin film and used as a sample. The measurement was conducted under a condition of a measurement length of 100 mm (distance between holders) and the tensile speed was 500 mm/min, and the tensile elongation was determined by the following expression.

Tensile elongation(%)=Distance between holders at break(mm)/original distance between holders (100 mm)×100

(11) Haze (%)

Using a haze meter (NDH 4000) manufactured by Nippon Denshoku Industries Co., Ltd., the haze of the center of the film in the TD direction was measured in accordance with the Japanese Industrial Standard JIS K 7136.

(12) Wetting Tension (mN/m)

A corona-treated surface of a film was measured using a liquid mixture for wetting tension tests, No. 36.0 to 54.0 (manufactured by FUJIFILM Wako Pure Chemical Corp.) in accordance with Japanese Industrial Standard JIS K 6768. Regarding the measurement locations, the wetting tension was measured at 5 locations at 200 mm intervals from the center toward both ends in the TD direction. This was measured every 1 m in the MD direction, and a total of 50 locations were measured. The minimum and the maximum of values of wetting tensions measured at 50 locations are shown in Table 3. A wetting tension of 44 mN/m or higher is usually practical, but in particular 46 mN/m or higher is preferred.

(13) Bag Breakage Resistance (Bag Drop Test)

[Lamination Step]

A urethane adhesive (DICDRY LX-401A/SP-60, manufactured by DIC Corp.) was applied to a film surface such that the dry application amount should be 3.0 g/m$^2$, and then heat-treated at 80° C. Then, on the adhesive side after heat treatment, an unstretched polyethylene film (T.U.X MC-S, 50 μm, manufactured by Mitsui Chemicals Tohcello, Inc.) was dry-laminated on a metal roll heated to 80° C. at a nip pressure of 490 kPa. Further aging according to recommendations for the adhesive was performed to obtain a laminated film.

[Preparation of Bag Sample]

The produced laminated film was cut into two pieces having a size of 200 mm×300 mm. Then, the polyethylene films were put together and heat-sealed on three sides with 10 mm widths to form a three-sided bag. The sealing condition was set to 160° C. for 1 second. A three-way bag was filled with 1000 ml of water, then the air inside the bag was released, and the remaining one side was heat-sealed at a width of 10 mm. Then, 10 ml of air was injected into the bag using a syringe, and the bag was tightly sealed again by heat-sealing to prepare a test sample. The sealing condition was set to 160° C. for 1 second. Adding a small amount of air causes more damage from water against the bag, and the test is conducted under harsher conditions than with water only.

[Bag Drop Test]

The prepared test sample was subjected to a test A, in which the lower end of the test sample was dropped from a height of 1.2 m above a smooth stainless steel plate (SUS plate) with a thickness of 0.5 mm so that one film surface of the test sample hit the SUS plate, and subsequently, a test B, in which the sample was dropped from the same height so that one short side of the test sample hit the SUS plate. The tests A and B were alternately repeated until the test sample bag was broken, and the number of drops in Test A or B until the bag breakage was counted.

It should be noted that the test sample had two film surfaces and two short sides and was dropped so that the same film surface or the same short side hit the SUS plate, respectively.

The test was performed under an atmosphere of 23° C. and 50% RH with a sample number n=3. Table 3 shows the minimum number of drops before bag breakage. The number of times up to the bag breakage under these conditions is required to be 50 times or more for practical use, and 60 times or more is particularly preferred, and among them, 70 times or more is more preferred.

TABLE 3

| | Film relative viscosity η R | Capralctam Extracted amount (mass %) | Terminal content (mmol/kg) Amino group | Terminal content (mmol/kg) Caboxyl group | Missing dot number (dots) | Extensibility in 40% gradation | Impact Strength min/max | Impact Strength min (J) | Impact Strength max (J) | Bag Drop Number of breakage (times) | MD Elongation (%) | Wetting tension (mN/m) min | Wetting tension (mN/m) max | Haze (%) |
|---|---|---|---|---|---|---|---|---|---|---|---|---|---|---|
| Ex. 1 | 3.0 | 0.01 | 47 | 54 | 91 | ⊚ | 0.77 | 0.66 | 0.86 | 72 | 90 | 50 | 52 | 4.2 |
| Ex. 2 | 2.6 | 0.03 | 52 | 59 | 87 | ⊚ | 0.72 | 0.51 | 0.71 | 68 | 82 | 50 | 52 | 4.2 |
| Ex. 3 | 3.0 | 0.01 | 51 | 56 | 78 | ⊚ | 0.74 | 0.67 | 0.91 | 80 | 91 | 50 | 52 | 4.1 |
| Ex. 4 | 3.0 | 0.01 | 43 | 50 | 62 | ⊚ | 0.78 | 0.68 | 0.87 | 94 | 90 | 50 | 52 | 4.3 |
| Ex. 5 | 3.0 | 0.01 | 38 | 52 | 48 | ⊚ | 0.73 | 0.67 | 0.92 | 107 | 92 | 50 | 52 | 4.2 |
| Ex. 6 | 3.0 | 0.04 | 64 | 70 | 66 | ⊚ | 0.63 | 0.52 | 0.83 | 85 | 70 | 50 | 52 | 6.7 |
| Ex. 7 | 3.0 | 0.02 | 51 | 60 | 62 | ⊚ | 0.70 | 0.63 | 0.9 | 76 | 84 | 50 | 52 | 4.9 |
| Ex. 8 | 3.0 | 0.03 | 69 | 70 | 55 | ⊚ | 0.64 | 0.54 | 0.85 | 98 | 71 | 50 | 52 | 6.8 |

TABLE 3-continued

| | Film relative viscosity η R | Capralctam Extracted amount (mass %) | Terminal content (mmol/kg) Amino group | Terminal content (mmol/kg) Caboxyl group | Missing dot number (dots) | Extensibility in 40% gradation | Impact Strength min/max | Impact Strength min (J) | Impact Strength max (J) | Bag Drop Number of breakage (times) | MD Elongation (%) | Wetting tension (mN/m) min | Wetting tension (mN/m) max | Haze (%) |
|---|---|---|---|---|---|---|---|---|---|---|---|---|---|---|
| Ex. 9 | 2.9 | 0.05 | 73 | 74 | 71 | ○ | 0.59 | 0.49 | 0.83 | 65 | 68 | 50 | 52 | 7.5 |
| Ex. 10 | 3.0 | 0.02 | 50 | 67 | 64 | ◉ | 0.67 | 0.61 | 0.91 | 82 | 80 | 50 | 52 | 5.1 |
| Ex. 11 | 3.0 | 0.01 | 41 | 49 | 68 | ◉ | 0.72 | 0.67 | 0.93 | 88 | 89 | 50 | 52 | 3.8 |
| Ex. 12 | 3.0 | 0.11 | 39 | 53 | 94 | ◉ | 0.86 | 0.96 | 1.12 | 59 | 147 | 48 | 52 | 4.0 |
| Ex. 13 | 3.0 | 0.01 | 45 | 47 | 38 | ◉ | 0.76 | 0.71 | 0.94 | 106 | 90 | 50 | 52 | 4.1 |
| Ex. 14 | 3.0 | 0.02 | 52 | 68 | 43 | ◉ | 0.67 | 0.6 | 0.9 | 101 | 80 | 50 | 52 | 5.0 |
| Ex. 15 | 3.0 | 0.04 | 69 | 70 | 50 | ◉ | 0.62 | 0.53 | 0.86 | 93 | 71 | 50 | 52 | 6.7 |
| Ex 16 | 3.0 | 0.04 | 70 | 71 | 69 | ◉ | 0.63 | 0.55 | 0.87 | 81 | 72 | 50 | 52 | 6.8 |
| Ex. 17 | 3.0 | 0.02 | 53 | 62 | 78 | ◉ | 0.70 | 0.64 | 0.92 | 73 | 83 | 50 | 52 | 4.9 |
| Ex. 18 | 3.0 | 0.01 | 47 | 48 | 95 | ◉ | 0.74 | 0.67 | 0.91 | 75 | 90 | 50 | 52 | 3.8 |
| Ex. 19 | 2.9 | 0.06 | 75 | 78 | 47 | ◉ | 0.59 | 0.34 | 0.58 | 77 | 67 | 50 | 52 | 9.8 |
| Com. Ex. 1 | 2.2 | 0.03 | 48 | 52 | — | — | — | 0.10 | | — | 70 | 48 | 52 | 4.3 |
| Com. Ex. 2 | 2.7 | 0.10 | 108 | 117 | 200< | ○ | 0.48 | 0.34 | 0.71 | 41 | 42 | 50 | 52 | 9.2 |
| Com. Ex. 3 | 2.7 | 1.80 | 108 | 122 | 200< | Δ | 0.43 | 0.39 | 0.91 | 43 | 58 | 42 | 48 | 9.4 |
| Com. Ex. 4 | 2.8 | 0.07 | 80 | 82 | 160 | ○ | 0.49 | 0.43 | 0.88 | 48 | 60 | 46 | 50 | 8.2 |
| Com. Ex. 5 | 3.0 | 0.04 | 70 | 72 | 117 | ◉ | 0.61 | 0.53 | 0.87 | 87 | 73 | 50 | 52 | 6.7 |
| Com. Ex. 6 | 3.0 | 0.01 | 43 | 48 | 103 | ◉ | 0.74 | 0.68 | 0.92 | 71 | 93 | 50 | 52 | 4.3 |
| Com. Ex. 7 | 3.0 | 0.01 | 45 | 49 | 165 | ○ | 0.59 | 0.51 | 0.87 | 49 | 71 | 50 | 52 | 5.5 |

As is apparent from these results, the biaxially-stretched polyamide resin films of Examples 1 to 19 are polyamide resin films made from a polyamide resin obtained by polymerizing recycled monomers, and thus have excellent suitability for printing in low-gradation portions and impact strength with inhibited unevenness and show no problems in general properties such as film elongation, wettability, and haze, and are excellent in practical performances, as shown in the drop bag test.

In Comparative Example 1, the relative viscosity of the raw materials used was low, and the mechanical properties of the resulting film were low. In particular, the impact strength was low. This resulted in cutting trouble in the next step, and printing was not able to be performed normally.

Comparative Examples 2, 4, and 5 do not contain any polyamide resin obtained by polymerizing recycled monomers, and the amount of terminal amino groups or carboxyl groups derived from the remelted resin was large, and the crystallization rate of the film material was fast. Thus, local unevenness in the crystallization state of the surface was observed, and as a result, the printability of low-gradation portions was decreased, leading to a decrease in local adhesion in the drop bag test, which was thought to cause the bags to break more easily. Also, a decrease in elongation and variation in impact strength that may have been caused by impurities in the remelted resin were observed.

The same raw materials as in Comparative Example 2 were used, and sequential stretching was performed in Comparative Example 3. As a result, the amount of monomers in the film increased. This resulted in a localized deterioration of suitability for printing in low-gradation portions and similarly resulted in deteriorated results of the drop bag test. There was also a decrease in elongation and variation in impact strength that could be attributed to impurities in the remelted resin.

Comparative Example 6 is a film obtained using a polyamide resin consisting only of a virgin monomer. Although there were no problems in general properties or practical performance, the reproducibility was poorer than that of a film prepared using a recycled monomer in terms of printability of low-gradation portions.

A polyamide resin consisting only of virgin monomer was used in Comparative Example 7, but the temperature control of the casting roll was insufficient, and variations in the degree of crystallinity on the surface of the unstretched film occurred. Therefore, lacking of uniformity in the degree of crystallinity on the film surface of the surface after stretching also occurred, and, as a result, the printability of low-gradation portions decreased. Furthermore, portions where the thickness accuracy after stretching exceeded 15% were observed, causing unevenness of impact strength and elongation.

The invention claimed is:

1. A polyamide resin film, wherein, when the is halftone-printed, the polyamide resin film includes 100 or fewer missing dots in 1000 mm$^2$ of a 10% gradation part in a halftone-printed film,
   the polyamide resin film comprises a polyamide resin that shows a half width of 10° C. or more of a crystallization peak during cooling and a terminal amino group content and a terminal carboxyl group content in the polyamide resin film are each 80 mmol/kg or less.

2. The polyamide resin film according to claim 1, which has a caprolactam monomer concentration of 1.6 mass % or less in the polyamide resin film.

3. The polyamide resin film according to claim 1, wherein a ratio (minimum/maximum) of a minimum of film impact strength to a maximum of film impact strength under an atmosphere at a temperature of 23° C. and a humidity of 50% RH is 0.5 to 1.0.

4. The polyamide resin film according to claim 1, which is biaxially stretched.

5. A laminated film comprising the polyamide resin film according to claim 1, and a sealant resin layer laminated on the polyamide resin film.

6. A packaging material comprising the polyamide resin film according to claim 1.

7. A laminated film comprising the polyamide resin film according to claim 2, and a sealant resin layer laminated on the polyamide resin film.

8. A packaging material comprising the polyamide resin film according to claim 2.

* * * * *